United States Patent [19]

Ghelli

[11] 4,139,460
[45] Feb. 13, 1979

[54] METHOD FOR DECONTAMINATING WASTE MATERIAL FROM CHROMIUM MINERAL PROCESSING BY WET TREATMENT WITH SULPHUR

[75] Inventor: Giovanni Ghelli, Savona, Italy

[73] Assignee: Luigi Stappani di P. Stappani & C., Milan, Italy

[21] Appl. No.: 770,040

[22] Filed: Feb. 18, 1977

[30] Foreign Application Priority Data

Feb. 24, 1976 [IT] Italy ............................... 20516 A/76

[51] Int. Cl.² .............................................. C02B 1/20
[52] U.S. Cl. ....................................... 210/45; 210/49; 210/50; 210/56; 210/DIG. 30; 423/55; 423/607
[58] Field of Search ................... 210/50, 42 R, 56, 49, 210/47, 45, DIG. 30; 423/607, 595, 55, 57

[56] References Cited

U.S. PATENT DOCUMENTS

| 2,209,907 | 7/1940 | Tarr | 423/607 |
| 2,246,396 | 6/1941 | Tarr et al. | 423/607 |
| 2,350,960 | 6/1944 | Darrin | 423/607 |
| 3,803,032 | 4/1974 | Adachi | 210/DIG. 30 |
| 3,981,965 | 9/1976 | Gancy et al. | 210/DIG. 30 |

*Primary Examiner*—Charles N. Hart
*Assistant Examiner*—Benoit Castel
*Attorney, Agent, or Firm*—Fleit & Jacobson

[57] ABSTRACT

A method for decontaminating waste materials, wherein the residue of water leaching of the roasted chromium mineral containing water soluble hexavalent chromium compounds is wet ground and classified until obtaining such a granulometrical distribution that not more than 5–10% of the particles have an average size larger than 0.4 mm, and 40–60% of the particles have an average size less than 0.8 mm, and is then subjected to wet treatment under vigorous stirring at about 100° C. with sulphur, in an aqueous emulsion of akaline or alkaline-earth sulphide for 1–4 hours, the percentage of solids in the reactor being in the range of 1–60%, preferably 30–35% by weight; and wherein the reacted slurry is thickened and filtered to provide the restored or decontaminated earth and an effluent, which is partly recycled to grinding or to reaction.

11 Claims, 1 Drawing Figure

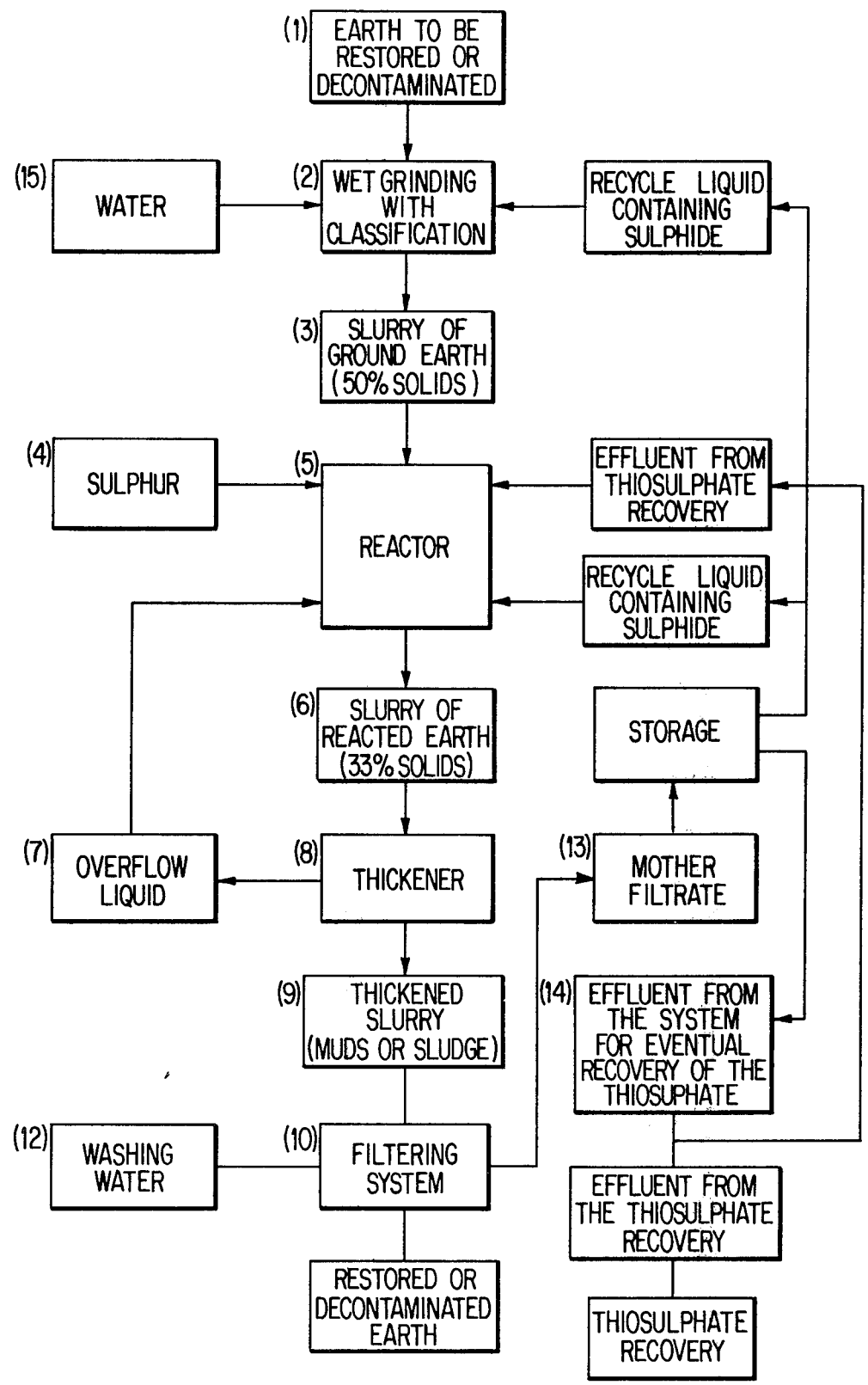

METHOD FOR DECONTAMINATING WASTE MATERIAL FROM CHROMIUM MINERAL PROCESSING BY WET TREATMENT WITH SULPHUR

The invention relates to a method for decontaminating waste material from chromium mineral processing by wet treatment with sulphur.

The invention also relates to concurrent recovery of sodium thiosulphate.

In the extraction process of water soluble hexavalent chromium compound from mineral, it is known that the latter is subjected to an alkaline roasting treatment is oxidizing environment at a temperature as high as about 1000–1100° C. and then leached in water. However, this leaching has an insuperable economical limit corresponding to a minimum content of soluble hexavalent chromium, indicated as $CrO_3$, in the range of about 0.1 – 1.0% parts by weight of the depleted mixture.

Therefore, it can be readily understood that the solid wastes of chromium mineral processing give rise to serious problems from a pollution standpoint of the environment in which they are admitted or exhausted, whereas the decontamination thereof gives rise to other problems from an economical standpoint since, in a chromium mineral processing plant, the ratio of waste material and finished product, indicated as equivalent sodium bichromate, is often very close to unit.

The problem of restoration or decontamination of these solid wastes has already been the goal of several researches. For example, it has been proposed to reduce hexavelent chromium contained in the residue of the "earth" (this term being referred to in the following for the waste material) leaching to insoluble trivalent chromium compound by suitable reducing agents both by wet method (at temperatures up to 100° C.) with ferrous sulphate or other metal ions, allowing this reduction due to the position thereof in the electrochemical series of the elements, and by dry method at high temperature with carbon or other inexpensive carbonaceous materials.

In the economical estimate of such system, the essential factors are the value of the reducing additive and the complexity of the operating process, apart from the economical loss represented by the reduction in the oxidizing capacity of chromium contained in the earths from hexavalent to trivalent chromium.

It has been found that the problem of decontamination from hexavalent chromium compounds can be sufficiently economically solved by the method according to the present invention which, while decontaminating the waste earths, can use to advantage the oxidizing capacity of hexavalent chromium to provide a valuable product by using entirely or partly also the sodium cation of the earth being restored or decontaminated; and particularly, the method according to the present invention is based on the reaction between alkaline-or alkaline-earth chromate (contained in the earths to be restored or decontaminated) and an aqueous solution of sulphur in alkaline or alkaline-earth sulphide, carried out at about 100° C. and vigorously stirring, according to the reaction:

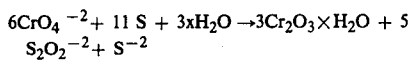

$$6CrO_4^{-2} + 11\,S + 3xH_2O \rightarrow 3Cr_2O_3 \times H_2O + 5 S_2O_2^{-2} + S^{-2}$$

The process can be carried out as a continuous, semi-continuous or batch process according to well known techniques of hydrometallurgy peculiar to the chemical art of wet mineral treatment.

The method according to the present invention consists of reacting a slurry of earths to be restored or decontaminated with sulphur in the presence of an alkaline or alkaline-earth sulphide at 100° C. and vigorously stirring. The sulphide, which should be present just from the beginning in the reaction medium, will cause the solution of sulphur with formation of a particularly reactive polysulphide. Since the sulphide anion is formed in the reaction between chromate and sulphur (also a thiosulphate), it can be reused by a convenient recycle to the reaction of the final filtered liquid. As a practical matter, it is only needed to initially supply sulphide and then use the recycle liquors. Obviously, this would substantially annul the cost for this essentially important reactant, since the latter is effective not only as an intermediate product, but also as a catalyst.

In order that the method according to the present invention be more clearly understood, an illustration thereof in the form of a general scheme which is representative of a continuous operation is set out in the Figure.

As it will be seen from the Figure, the earth 1 to be restored or decontaminated is first supplied to grinding 2, where it is wet ground with recycle liquid or water 15, and classified to provide the desired granulometry, which is of essential significance and will therefore be again considered hereinafter in further details. Thus, a "slurry" of ground earth 3 is provided, which slurry is supplied to reactor 5. The latter is fed with sulphur 4 and final recycle liquid containing the sulphide (sodium sulphide is directly introduced only at the starting step), from the final step, that is from the overflow liquid of the thickener. A slurry of reacted earth 6 having a higher dilution comes out of the reactor 5 and is supplied to the thickener 8. Therefrom, the overflow liquid 7 is recycled to the reactor, and the thickened slurry 9 is supplied to a filtering system 10, to which washing water 12 arrives and from which a mother-filtrate comes out, which partly is recycle to the grinding or to the reactor, and partly forms the effluent from the plant or system, and which, for example, can serve for thiosulphate recovery, and the restored or decontaminated earth 11.

As above mentioned, concurrently with the decontamination of the waste product, sodium thiosulphate can be obtained by the method according to the present invention, wherein for sulphur oxidation use is made of the hexavalent chromium of the chromates, present in the waste material, which is reduced to insoluble trivalent chromium hydrate according to the well known oxi-reductive mechanism.

Even apart from the possibility of thiosulphate recovery, the method according to the present invention is a sharp improvement in the field of decontamination processes, due to simplicity in carrying out the method and ready availability and substantial economy of sulphur, which is the main reactant. Moreover, the consumption of sulphur does not exceed 5 kg per 100 kg of earth. The consumption of sulphide is negligible, as it is only initially introduced and is then automatically formed again in the recycle.

Finally, the method is reasonably simple also as to equipment requirements.

Due to the importance of the chemical and granulometrical composition of the components of the reation according to the present invention, some notices are deemed useful on the method used for determining the content of hexavalent chromium leachable with water in the waste materials; and particularly, the sample is first disintegrated, leached at room temperature with water under stirring for 20 minutes in a ratio water-sample of 10:1; then it is filtered and by the photometrical method of diphenylcarbazide the content of hexavalent chromium is determined in the solution.

The rate of leached hexavalent chromium is related to the starting material. Acceptable exhaust rates are considered those as equivalent to 1 mg chromium for each 100 g of material (10 ppm).

For better clarifying the process scheme and pointing out the advantages of the present invention, quantitative experimental data are given here below as relating to the development of the process according to the set forth scheme.

The earth 1 to be restored or decontaminated comes from a state of chromium mineral processing, wherein a water leaching has provided a material having the following distinctive features:

moisture = 23%
water soluble Cr, determined as above described = 500 mg
granulometry (grain size)
  1–5 mm; 7%
  1 mm: 23%
  0.2 mm; 0.4%
  less than 0.2 mm: 69.6%

After supply to wet grinding with classification, the solid material of the slurry has the following granulometrical distibution:
  0.355 mm: 5–10% by weight
  0.250 mm: 5–10% by weight
  0.150 mm: 15–20% by weight
  0.075 mm: 15–20% by weight
  less than 0.075 mm: 60–40% by weight As above described, wet grinding is effected with water 15, or with recycle filtrate 13, depending on the desired content of salts soluble in the effluent 14.

Wet grinding 2 is effected with a solid content in the slurry of 50%, by weight, so that such a material 3 reaches the reactor 5.

The reaction in 5, is carried out with a solid content in the slurry preferably in the range of 30–35% by weight, the addition of liquid is indifferently effected by the overflow of thickener 7, should the latter be present, or by recycle filtrate 13.

Therefore, a reacted slurry having a solid content of about 33% reaches said thickener 8, to be installed particularly in a continuous type of process.

To the reactor 5, provided with stirrer and heating chamber, sulphur, either solid or molten, depending on the metering deemed as the best (4), is fed in an amount of 5 parts for each 100 parts by weight of earth to be restored or decontaminated, on dry. The average dwell time in the reactor is of 1–4 hours at a temperature of 100° C.

From the thickener 8, as suitably dimensioned in function of the solid characteristics, a thickened product 9 is provided, having a solid content of 50% by weight, just as the slurry arriving at the reactor from grinding.

The filtering system (preferably to be carried out by vacuum filters) provides at its outlet the wet restored or decontaminated earths and a filtrate which is partly recycled to the reactor and/or grinding, and partly makes up the liquid effluent and can be supplied to the eventual recovery of thiosulphate or other treatment.

As tested with a particular type of earth to be restored or decontaminated, as it will be specified in the following examples, it will be seen that the content of thiosulphate, even recirculating in grinding step, is never too high; maximum rates of 5–6% by weight of solution are achieved, in balance with the exhausted earths. Additionally, depending on the general composition of the earths to be restored or decontaminated in arrival, in addition to sodium cation the effluents also contain calcium and magnesium.

These liquids, that should not be discharged as such, can then, alternatively to a recovery of thiosulphate, be used for exploiting the reducing power thereof (due to the presence of sulphur at valency 4), and this particularly in reducing processes of hexavalent chromium in acid or alkaline environment at high temperature; or, prior to discharge, should be treated with a mineral acid (preferably sulphuric acid) to cause the release of sulphur (which can be recovered in the process by filtering).

In this treatment sulphurous gases are produced, also containing some sulphurated hydrogen, which gases should be removed by alkaline scrubbing producing solutions of sulphite and sulphide that can be conveniently recirculated to the processing reactor for the earths to be restored or decontaminated (No. 5 of the general scheme). Alternatively, the gases being developed can be caused to be directly absorbed by the slurry in the processing reactor.

Finally, the liquid effluents are provided from the filtering of the sulphur to be recovered which, even if fouled with calcium sulphate, is however suitable for reintroduction into the reactor. In any case, these effluents could however, be conveniently brought to neutrality by percolation through a bed of limestone.

Hereinafter, some representative exemplary embodiments are finally given, which should in no way be intended as a restriction to the method according to the present invention, as selected among many tests, both on laboratory and pilot plant scale with earths of various origin, in a continuous, batch or semi-continuous type of operation.

Particularly, the following examples pertain to four test sets carried out according to the semi-continuous technique.

In practice, the reactor is charged a first time and the reaction is carried out; half of the mass is discharged and on the residual half of the reacted slurry further earths, sulphur and recycle filtrate are charged; then proceeding with the above shown technique for the number of tests and then the results obtained are averaged.

Furthermore, a test for sulphur recovery from the filtrates is given.

EXAMPLE 1 (Laboratory)

Number of average tests:20
Amount of earth charged in each test:500 g
Prior to grinding, the material used is characterized by the following essential data:

loss at 110° C. (moisture): 25.0%
size of grains (friable agglomerates):
  larger than 2 mm: 30–35%
  smaller than 2 mm: 70–65% water soluble hexavalent chromium, determined by the method set forth in the description: 75 mg for each 100 g of earth on dry.

The wet earth is ground by any of the standard laboratory techniques until having a granulometrical distribution within the range previously set forth in the description, that is:
  larger than 0.325 mm:5–10% by weight
  larger than 0.250 mm:5–10% by weight
  larger than 0.150 mm:15–20% by weight
  larger than 0.075 mm:15–20% by weight
  less than 0.075 mm:60–40% by weight With these granulometrical characteristics, which are maintained substantially unaltered during the reaction and the other steps of the process, it is possible to carry out a good reaction, while having good characteristics of slurry filterability.

For each reaction of this example, on 1000 g slurry residual from preceding reaction, the laboratory reactor is charged with:
  Ground earths, as above shown:500 g
  Sulphur:20 g
  Recycle filtrate:480 g As average rates of 20 tests, carried out at mass boiling temperature (101° C.) for 1 hour, the following results are obtained:

Reaction slurry having:
  specific gravity (at 80° C.) 1.3
  solid percentage 30 g /100 g
  By filtering, this slurry provides:

(a) filtered and washed earths having:
  losses at 110° C. (moisture) 25.0%
  water soluble hexavalent chromium 1 mg/100 g (1.3 referred to dry material);
(b) filtered liquid from which, depending on the amount of washing water used, an amount of 60–70 g for each 100 g of treated earth (on dry) has to be drained, while the residual amount is recirculated to the reactor. This liquid has the following characteristics:
  pH 10.7
  $Na_2S$ equivalent 0.9 g for each 100 g liquid (chemical form $Na_2S_{4.9}$)
  $Na_2S_2O_3$ equivalent 4.7 g for each 100 g of liquid
  Ca (as CaO) 1.70 g for each 100 g of liquid
  Mg absent
  Na 0.76 g for each 100 g of liquid.

The recirculated filtered liquid has the same composition as the drained liquid and is in balance with the reacted earths.

EXAMPLE 2 (Pilot Plant)

Essentially the same treatment modalities of Example 1 are followed, with the exception that grinding is wet accomplished with recirculated filtrate in a small rod mill. Upon reaction completion, the solid-liquid phase is separated by an industrial type of vacuum rotary pilot filter.

For each reaction of this example, on 150 kg slurry residual from preceding reaction, the pilot reaction is charged with:
  Wet ground earth slurry 200 kg, corresponding to 100 kg earth on dry at 110° C.
  Sulphur: 6 kg
  Recycle filtrate: 100 kg.

As average rates of 10 tests, carried out for one hour at mass boiling temperature (101° C.), the following data are obtained:

Reaction slurry, having:
  specific gravity (at 80° C.): 1.25
  solid percentage: 35 kg/100 kg.
  By filtering, this slurry provides:

(a) Filtered and washed earths, having:
  losses at 110° C.: 22.0%
  water soluble hexavalent chromium: 0.8 mg/100 g (1.0 realted to dry earth).
(b) Filtered liquid from which, depending on the amount of washing water used, 50–60 kg/100 kg treated earth (on dry) have to be drained; the remaining amount is recirculated, partly to grinding and partly to the reactor. This liquid has the following characteristics:
  pH = 10.9
  $Na_2S$ equivalent: 1.1 kg/100 kg liquid
  $Na_2S_2O_3$ equivalent: 4.9 kg/100 kg liquid
  Ca, Mg and Na: undetermined.

EXAMPLE 3 (Laboratory)

Number of average tests: 20
Amount of earth charged in each test: 500 g.

The material used in this example is characterized, pior to grinding, by the following essential data:

loss at 110° C. (moisture): 18.0%
size of grains (rather hard agglomerates):
  larger than 2 mm: 90–95%
  less than 2 mm: 10–5%
water soluble hexavelent chromium determined by the method shown in the description: 300 mg/100 g earth on dry at 110° C.

The earth is ground as in Example 1.

For each reaction of this example, on 1000 g slurry residual from proceding reaction, the laboratory reactor is charged with:
  is charged with:
  Ground earths:500 g
  Sulphur:25 g
  Recycle filtrate:500 g As average rates of 20 tests carried out for one hour at mass boiling temperature (101° C.), the following results are obtained:

Reaction slurry having:
  specific gravity (at 80° C.): 1.25
  solid percentage: 36.5%
  By filtering, this slurry provides:

(a) Filtered and washed earths having:
  loss at 110° C. (moisture): 23.0%
  water soluble hexavalent chromium: 0.4 mg/100 g (0.5 referred to dry material).
(b) Filtered liquid from which, depending on the amount of washing water used, an amount of 50–60 g/100 g treated earth (on dry) has to be drained. The remaining amount is recirculated to the reactor. This liquid has the following characteristics: pH: 10.5
  $Na_2S$ equivalent: 0.8 g/100 g liquid (chemical form $Na_2S_{4.8}$)
  $Na_2S_2O_3$ equivalent: 3.2 g/100 g liquid
  Ca (as CaO): 0.53 g/100 g liquid
  Mg (as MgO): 0.24 g/100 g liquid Na: undetermined.

The recirculated filtered liquid has the same composition as the drained liquid and is in balance with the reacted earths.

EXAMPLE 4 (Pilot Plant)

The treatment procedures are the same as those shown for Example 2 Pilot Plant.

For each reaction of this example, on 150 kg slurry residual from preceding reaction, the pilot reactor is charged with:

slurry of wet ground earths: 200 kg, corresponding to 100 kg earth on dry at 110° C.
sulphur: 6.5 kg
recycle filtrate: 100 kg.

As average rates of tests carried out for one hour at mass boiling temperature (101° C.), the following results are obtained:

reaction slurry having:
specific gravity (80° C.): 1.3
solid percentage: 38 kg/100 kg
By filtering, this slurry provides:

(a) filtered and washed earths having: loss at 110° C.: 28.0%
water soluble hexavalent chromium: 0.4 mg/100 g (0.6 referred to dry earth).
(b) filtered liquid from which, depending on the amount of washing water used, an amount of 40-50 kg/100 kg treated earth (on dry) has to be drained, while recirculating the remaining amount partly to grinding, and partly to the reactor. This liquid has the following characteristics:
pH 10.9
$Na_2S$ equivalent: 1.0 kg/100 kg liquid
$Na_2S_2O_3$ equivalent: 4.9 kg/100 kg liquid
Ca, Mg and Na: undetermined.

EXAMPLE 5

Sulphur recovery from average drain liquid of several laboratory tests

The liquid has the following characteristics: $Na_2S$ equivalent: 0.83 g/100 g (Chemical form: $Na_2S_{4.9}$)
$Na_2S_2O_3$ equivalent: 4.87 g/100 g
$Na_2SO_4$ equivalent: 0.12 g/100 g
Ca (as CaO): 1.36 g/100 g
Mg: absent
Na: 0.74 g/100 g
pH: 10.5

1000 g liquid are treated with 15 g concentrated sulphuric acid, stirring for 45 minutes at a temperature at 50° C. The product is filtered and 40 g solid are recovered (on dry, under vacuum at room temperature), containing 18 g sulphur. The remaining portion is calcium sulphate.

This solid is recirculated to the reactor.

The filtrate of this treatment has a pH 3.

What is claimed is:

1. A process for decontaminating waste material containing water-soluble hexavalent chromium as a contaminant and constituting the residue obtained after subjecting a chromium mineral to an alkaline roasting treatment in an oxidizing environment at a temperature up to about 1100° C. and then leaching the resulting roasted product with water, said process comprising:
   (a) wet grinding and classifying the waste material with an aqueous liquid to obtain an aqueous slurry of the ground waste material containing about 50% by weight of solids and in which the granulometrical distribution of the particles is such that not more than 5 to 10% of the particles have an average larger than 0.2 mm and less than 0.4 mm. and 40 to 60% of the particles have an average size less than 0.08 mm.;
   (b) reacting the aqueous slurry of the ground and classified waste material obtained in step (a) with an aqueous emulsion containing a metallic sulphide selected from the group consisting of an alkali metal sulphide and an alkaline earth metal sulphide and elemental sulphur in solid or molten form in an amount of about 5 parts of sulphur per 100 parts of the waste material on a dry weight basis, at a temperature of about 100° C. for about from 1 to 4 hours with vigorous stirring, to obtain a reaction product comprising an aqueous slurry of the waste material having a solids content of about from 30 to 35% by weight and containing water-insoluble trivalent chromium hydrate and thiosulphate and sulphide ions;
   (c) thickening the reaction product obtained in step (b) to a solids content of about 50% by weight to obtain a thickened slurry of the waste material containing the water-insoluble trivalent chromium hydrate and the thiosulphate and sulphide ions, and an overflow liquid containing sulphide ions which is recycled to step (b);
   (d) filtering the thickened slurry to obtain the waste material containing the water-insoluble trivalent chromium hydrate in an essentially decontaminated form and a mother liquor;
   (e) recycling a sufficient amount of the mother liquor obtained in step (d) to step (a) to serve as the aqueous liquid for adjusting and maintaining the recited solids content of 50% by weight;
   (f) recycling a sufficient amount of the mother liquor obtained in step (d) to step (b) for adjusting and maintaining the recited solids content of 30 to 35% by weight; and
   (g) recycling a portion of the mother liquor obtained in step (d) to a thiosulfate recovery system to recover the thiosulphate and leave a liquid effluent which is recycled to step (b).

2. The process of claim 1 wherein the elemental sulphur in step (b) is in solid or molten form.

3. The process of claim 1 wherein the sulphide ions contained in the aqueous emulsion in step (b) are derived from an alkali metal sulphide.

4. The process of claim 3 wherein the alkali metal sulphide is sodium sulphide.

5. The process of claim 1 wherein the sulphide ions contained in the aqueous emulsion in step (b) are derived from an alkaline earth metal sulphide.

6. The process of claim 1 wherein the mother liquor obtained in step (d) is employed as a reducing agent to reduce hexavalent chromium to trivalent chromium in an acid or alkaline environment at high temperature.

7. The process of claim 1 wherein the mother liquor obtained in step (d) is treated with mineral acid to obtain a liquid mixture containing elemental sulphur, filtering the mixture to recover the sulphur, and recycling the sulphur to step (b).

8. The process of claim 1 wherein the mother liquor obtained in step (d) is treated with sulphuric acid to yield sulphurous gases including sulphurated hydrogen, and recycling the gases directly to step (b) to be absorbed by the slurry.

9. The process of claim 1 wherein the mother liquor obtained in step (d) is treated with sulphuric acid to yield sulphurous gases including sulphurated hydrogen, subjecting the gases to alkaline scrubbing to obtain sulphite and sulphide solutions, and recycling these solutions to step (b).

10. The process of claim 1 wherein the sulphide ions present in the aqueous emulsion in step (b) are furnished this one time only, being thereafter automatically formed again and continuously recycled throughout the process.

11. The process of claim 1 carried out in a batch, a semi-continuous, or a continuous manner.

* * * * *

UNITED STATES PATENT AND TRADEMARK OFFICE
CERTIFICATE OF CORRECTION

PATENT NO. : 4,139,460
DATED : February 13, 1979
INVENTOR(S) : GIOVANNI GHELLI

It is certified that error appears in the above-identified patent and that said Letters Patent are hereby corrected as shown below:

Title Page, change "[73] Assignee: Luigi Stappani de P. Stappani & C.," to-- [73] Assignee: Luigi Stoppani di P. Stoppani & C. --;

Column 1, line 65, in the formula, change "$S_2O_2^{-2}$" to --$S_2O_3^{-2}$--;

In the <u>General Scheme for a Continuous Process</u>:

Block 14, change "FROM" to --TO-- and delete the upper portion of the joining line between Block 14 and the block reading "EFFLUENT FROM THE THIOSULPHATE RECOVERY ";

Add an arrow on the line between the Blocks reading "EFFLUENT FROM THE THIOSULPHATE RECOVERY" and "THIOSULPHATE

UNITED STATES PATENT AND TRADEMARK OFFICE
CERTIFICATE OF CORRECTION

PATENT NO. : 4,139,460

DATED : February 13, 1979

INVENTOR(S) : GIOVANNI GHELLI

It is certified that error appears in the above-identified patent and that said Letters Patent are hereby corrected as shown below:

RECOVERY" with the arrow pointing toward the former;

Add a line joining Block 14 and the Block reading "THIOSULPHATE RECOVERY" with an arrow on the line pointing toward the latter; and Number the Block reading "RESTORED OR DECONTAMINATED EARTH" as --11--

Signed and Sealed this

Twenty-fourth Day of July 1979

[SEAL]

Attest:

LUTRELLE F. PARKER

*Attesting Officer*     *Acting Commissioner of Patents and Trademarks*